United States Patent [19]

Hale

[11] Patent Number: 4,767,436
[45] Date of Patent: Aug. 30, 1988

[54] APPARATUS AND METHOD FOR MANUFACTURING A MOLDED GLASS STEM

[75] Inventor: John R. Hale, East Hempfield Township, Lancaster County, Pa.

[73] Assignee: RCA Licensing Corporation, Princeton, N.J.

[21] Appl. No.: 114,356

[22] Filed: Oct. 29, 1987

[51] Int. Cl.[4] .................... C03B 23/07; C03B 23/217; C03C 27/02
[52] U.S. Cl. ................................ 65/59.27; 65/59.28; 65/139; 65/155; 455/33
[58] Field of Search ................. 65/59.25, 59.27, 59.28, 65/59.6, 139, 155; 445/33

[56] References Cited

U.S. PATENT DOCUMENTS

| | | | |
|---|---|---|---|
| 2,030,185 | 2/1936 | Rose | 65/59.27 X |
| 2,107,254 | 2/1938 | Horn | 65/59.27 X |
| 2,338,507 | 1/1944 | Haas et al. | 445/33 |
| 2,340,879 | 2/1944 | Horn | 65/54 |
| 3,188,720 | 6/1965 | Husni | 65/59.25 X |
| 4,165,227 | 8/1979 | Nubani et al. | 65/59.28 X |
| 4,723,979 | 2/1988 | Fitzke et al. | 65/155 X |

*Primary Examiner*—Robert L. Lindsay
*Attorney, Agent, or Firm*—Eugene M. Whitacre; Dennis H. Irlbeck; Vincent J. Coughlin, Jr.

[57] ABSTRACT

A stem mold includes an improved first (upper) mold assembly and a conventional second (lower) mold assembly. The first mold assembly includes a conventional mold head and a plurality of lead-weights which are attached to one end of the mold head. The first mold assembly is improved by the inclusion of a novel first mold block which has a plurality of fillet recesses therein which communicate through guide openings with a plurality of buffer-pin-wells extending into a cavity in a second surface of the mold block. A novel lead-weight translator is disposed within the cavity in the mold block. The translator has a translator recess formed in one surface and a plurality of lead-weight apertures extending from the recess through the other surface of the translator. A pin holder is disposed within the translator recess. A plurality of pin apertures are formed through the pin holder and aligned with the buffer-pin-wells in the mold block and also with the lead-weight apertures in the translator. A plurality of buffer pins are disposed in the pin apertures and extend into the pin wells. The buffer pins are configured to extend between the lead-weights and the internal portions of the lead-in conductors to retain the external portion of the lead-in conductors within the second mold assembly during the stem manufacturing operation. The buffer pins accommodate lead-in conductors of various internal lengths.

3 Claims, 4 Drawing Sheets

APPARATUS AND METHOD FOR MANUFACTURING A MOLDED GLASS STEM

BACKGROUND OF THE INVENTION

The invention relates to an apparatus and method for manufacturing a molded glass stem, and more particularly to an apparatus and method for manufacturing a stem having a plurality of lead-in conductors of various internal lengths.

During the process of stem manufacturing, the individual lead-in conductors or leads must be supported at the top and the bottom during a press operation to insure proper positioning of the sealing portion of the leads within the glass fillets of the stem. Where the lead-in conductors comprise a three piece lead with an external and an internal section and a central Dumet section, it is important that the Dumet section be bonded securely within the glass fillets of the stem.

In the prior art it was conventional that the lead-in conductors were made having the same internal length. In order to attach the electron gun to the leads it was necessary to trim the internal portions of at least some of the leads to obtain the desired length. This trimming operation frequently caused chips in the glass fillets surrounding the leads and in some instances caused vacuum leaks through the stems and/or the generation of glass particles within the finished tube. Such a condition could result in failure of the tube or in rejection of the final tube for particles which adhere to the shadow mask and block the apertures thereof producing spots on the output screen of the tube.

In order to improve tube quality and to reduce the manufacturing costs involved with lead trimming and inspection of the stems, it is desirable to manufacture a stem having internal leads of the required lengths. Such a lead structure would facilitate attaching the internal components thereto without further trimming or inspection operations that are now required under conventional procedures.

Prior art stem molds include an upper and a lower section and necessitate the application of sufficient weight to the lead-in conductors to immobilize the lead-in conductors during the stem manufacturing operation. The high temperatures involved in melting the glass of the stem during stem manufacturing make it advisable for the lead-weights, which rest upon the internal portions of the lead-in conductors, to be sufficiently far away from the heat to prevent damage to the lead weights. Prior attempts to make stems having lead-in conductors of various internal lengths have required the frequent replacement of lead-weights due to thermal distortion or deterioration thereof. Additionally, it is difficult to manufacture stems of different internal lead lengths using conventional stem-making equipment, since any changes in the internal lengths of the lead-in conductors require corresponding changes in the lengths of the lead-weights.

It is therefore desirable that an apparatus and method be provided which will allow a modification of conventional stem molds, using lead-weights of uniform length, to provide stems having lead-in conductors of different internal lengths.

SUMMARY OF THE INVENTION

The stem mold used to manufacture the glass stem comprises a first mold assembly and a second mold assembly. The first mold assembly includes a mold head having therein a plurality of lead-weights of substantially equal length. The first mold assembly also includes a first mold block which has a first surface and an oppositely disposed second surface with a cavity formed therein. The first surface of the mold block includes a plurality of fillet recesses. Each of the fillet recesses communicates with a buffer-pin-well opening into the cavity formed in the second surface of the mold block. A lead-weight translator disposed within the cavity has a first surface and a second surface with a translator recess formed in one of said surfaces. A plurality of lead-weight apertures extend from the translator recess through the other surface of the translator. A pin holder is disposed within the translator recess. The pin holder has a plurality of pin apertures therethrough. A plurality of lead-in-conductor-buffer-pins are disposed within the pin apertures and extend into the pin wells. The buffer pins provide means for accommodating the lead-in conductors of different internal lengths. The buffer pins are in contact with the lead-weights which extends through the lead-weight apertures in the translator.

The second mold assembly is conventional and compliments the action of the first mold assembly to provide a stem having internal lead-in conductors of various lengths.

DETAILED DESCRIPTION OF THE PREFERRED EMBODIMENT

Figure 1:
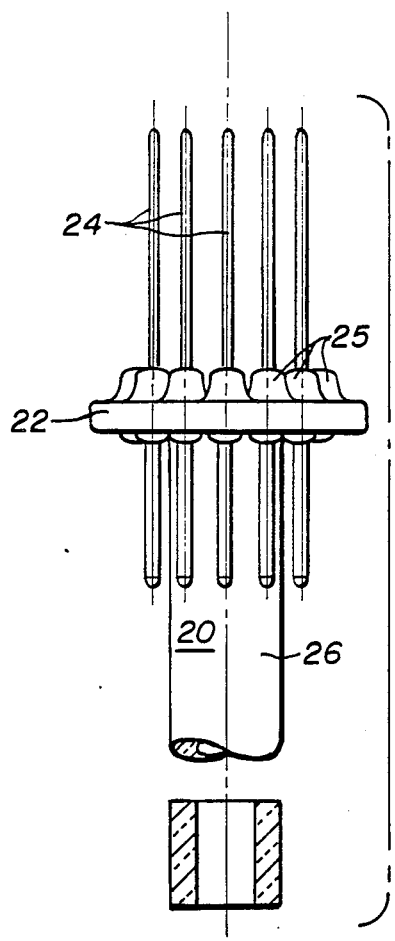
FIG. 1 is a partially cut-away longitudinal view of a conventional stem.
Figure 2:
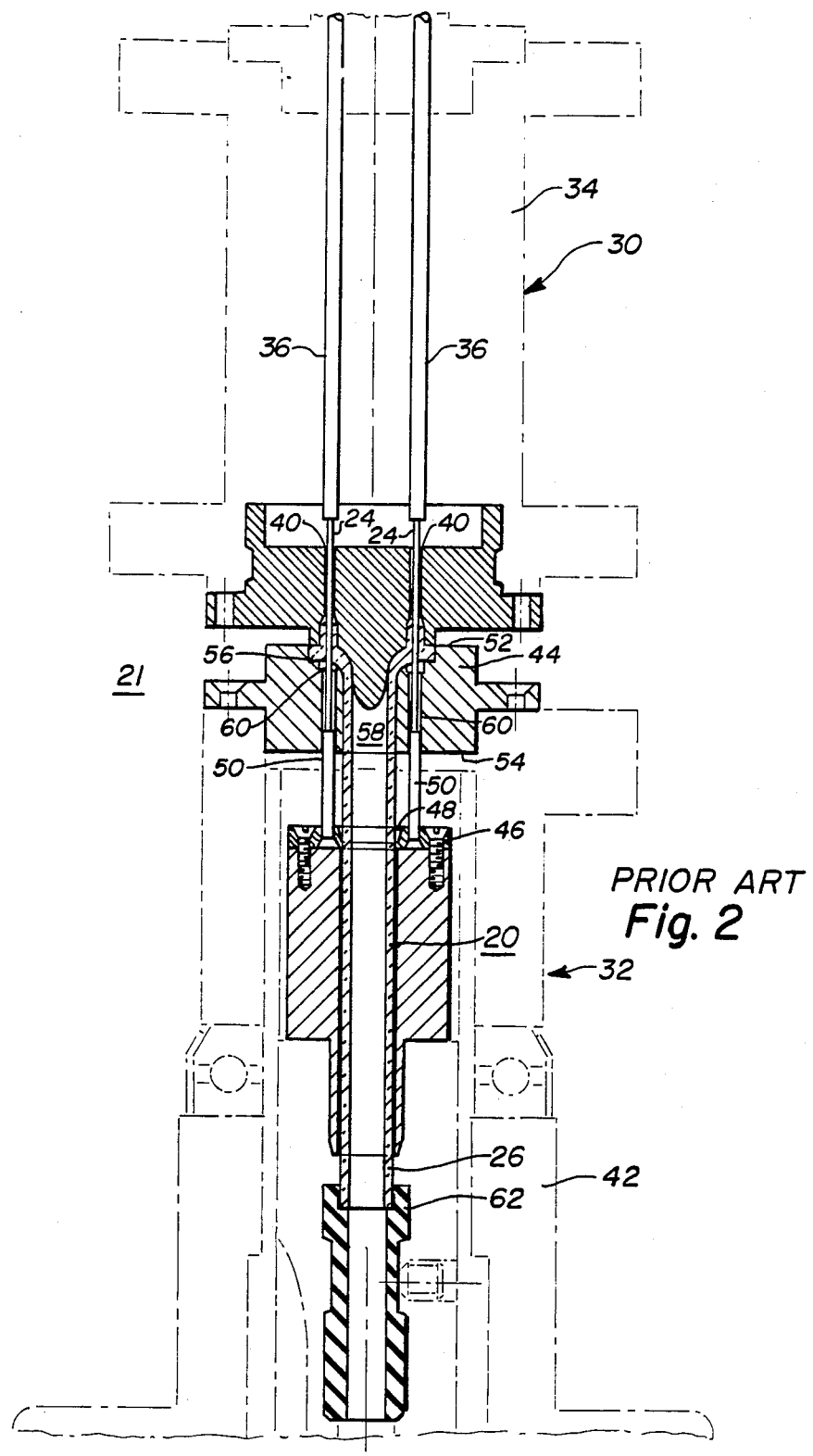
FIG. 2 is a cut-away sectional view of a conventional stem mold containing the stem shown in FIG. 1.

FIGS. 1 and 2 show a conventional stem 20 and stem mold 21. The stem 20 is used in an electron tube such as a cathode-ray tube, CRT. The stem 20 includes a glass disc 22 having a plurality of lead-in conductors 24 extending through a plurality of fillets 25. A tubulation 26 is integral with the glass disc 22 and provides a means for evacuating and tipping off the evacuated electron tube. The lead-in conductors 24 all have approximately the same internal and external length. In order to accommodate the internal tube components of the electron tube, it frequently is necessary to trim the internal portions of some of the lead-in conductors 24 to the proper lengths. Such a trimming operation requires additional processing and handling and occasionally results in a decrease in yield because of trimming-induced damage to the stem.

As shown in FIG. 2, the stem 20 is made by using the stem mold 21 comprising a first mold assembly 30 and a second mold assembly 32. The first mold assembly 30 includes a mold head 34 (only a portion of which is shown) having therein a plurality of lead-weights 36. A first mold block 38 is attached to one end of the mold head 34. A plurality of apertures 40 are formed longitudinally through the body of the first mold block 38 to accommodate the interior portions of the lead-in conductors 24 of the stem 20. The second mold assembly 32 has a mold body 42 with a second mold head 44 attached thereto. The second mold assembly 32 includes a moveable support platform 46 having a centrally disposed tubulation recess 48 formed therein. A plurality of lead-in-conductor-supports 50 are attached to the support platform 46. The second mold head 44 has a first surface 52 and an oppositely disposed second surface 54 which is spaced from the first surface. A stem forming recess 56 is formed in the first surface 52 of the second mold head 44. A centrally disposed tubulation aperture 58, formed in the bottom of the stem-forming recess 56, communicates with the second surface 54 of the second mold body 44. The recess 56 further includes a plurality of lead-in cavities 60 which circumscribe the tubulation aperture 58 and extend from the recess 56 to the second surface 54 of the second mold body 44. The cavities 60 are aligned with the lead-in-conductor-supports 50 and a portion of each of the supports 50 is disposed within the cavities 60. The tubulation 26 of the stem 20 rests on a tubulation support 62 in a lower portion of the second mold assembly 32.

As shown in FIG. 2, the lead-weights 36 rest upon the internal portions of the lead-in conductors 24 and provide sufficient weight to hold the external portions of the lead-in conductors 24 firmly against the lead-in-conductor-supports 50 in the second mold assembly 32.

This prior art stem mold configuration requires that the lead-weights 36 be carefully designed to contact the lead-in conductors 24 without bending the lead-in conductors and damaging the stem. Variations in the lengths of the lead-in conductors 24, beyond the design tolerance, result either in insufficient contact between the lead-weights 36 and the lead-in conductors, or excessive contact and bending of the lead-in conductors. Lead-in conductors 24, shorter than the design tolerance, require lead-weights of longer lengths. However, the prior art stem mold configuration does not facilitate making stems having lead-in conductors of various lengths because such stems would also require the first mold assembly 30 of the stem mold 21 to have lead-weights of complimentary lengths. It is known in the art that to fabricate the stem 20, a considerable amount of heat must be generated to melt the glass which is used in the stem and to seal the lead-in conductors therethrough. In order to modify the prior stem mold 21 to provide some lead-in conductors of relatively short internal length, lead-weights of sufficiently long length are required to contact the internal portion of the lead-in conductors. The lead-in-conductor-contacting-end of such long-length lead-weights would be adjacent to the heat generated during sealing. Experience has shown that the sealing heat tends to damage the lead-weights 36 and this damage would be accelerated for the longer lead-weights. The lead-weights 36 already are of a considerable length, and their replacement is both time consuming and expensive. Longer lead-weights will further increase replacement time and expense.

Figure 3:
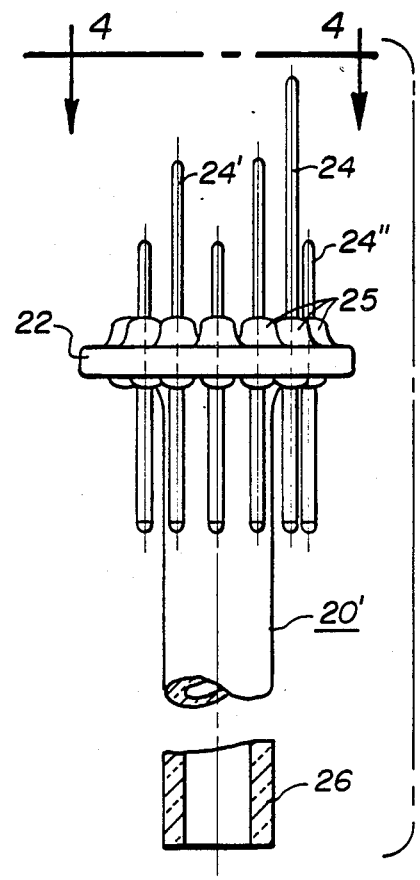
FIG. 3 shows partial cut-away longitudinal view of an improved stem made using the method and apparatus of the present invention.
Figure 4:
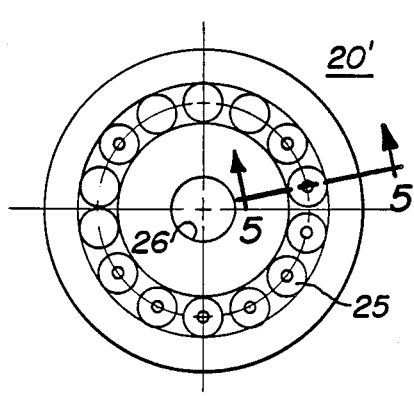
FIG. 4 shows the top view taken along line 4—4 of FIG. 3.
Figure 5:
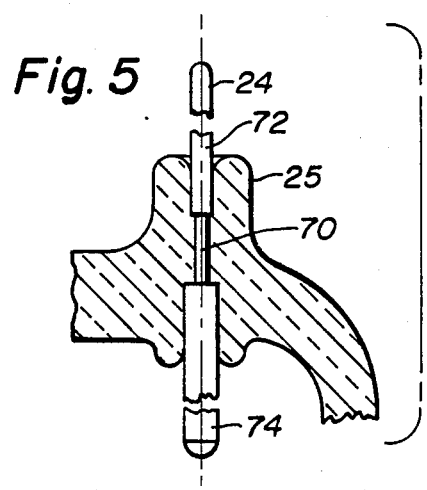
FIG. 5 is a partial sectional view taken along line 5—5 of FIG. 4.

An improved molded glass stem 20', having variable length lead-in conductors, is shown in FIGS. 3-5, where similar numbers are used to designate similar components. The stem 20' includes a glass support ring 22 having a plurality of stem leads 24, 24' and 24" embedded in fillets 25. The prime and double prime designations refer to progressively shorter internal portions for the lead-in conductors 24. A tubulation 26 extends from the glass ring 22. The lead-in conductors 24, 24' and 24" are formed and configured to circumscribe the tubulation 26 as shown in FIG. 4. A cross-section of a portion of the stem 20' through one of the fillets 25 is shown in FIG. 5. The lead 24 is a three-piece lead comprising a Dumet inner portion 70 and nickel internal and external portions 72 and 74, respectively. Dumet is a composite wire with a center core of 42% nickel-iron alloy and an outer sleeve of pure copper. This material seals well to soft glass, however, the expansion of Dumet is not the same in the radial direction as it is in the longitudinal direction, and because of this difference, it is desirable to keep the Dumet section of the lead, which is embedded in the glass fillet 25, short. Thus, in fabricating a stem 20' which has lead-in conductors of various lengths it is necessary to insure that the Dumet portion 70 of the leads is sealed well within the glass fillets 25 of the stem.

Figure 6:
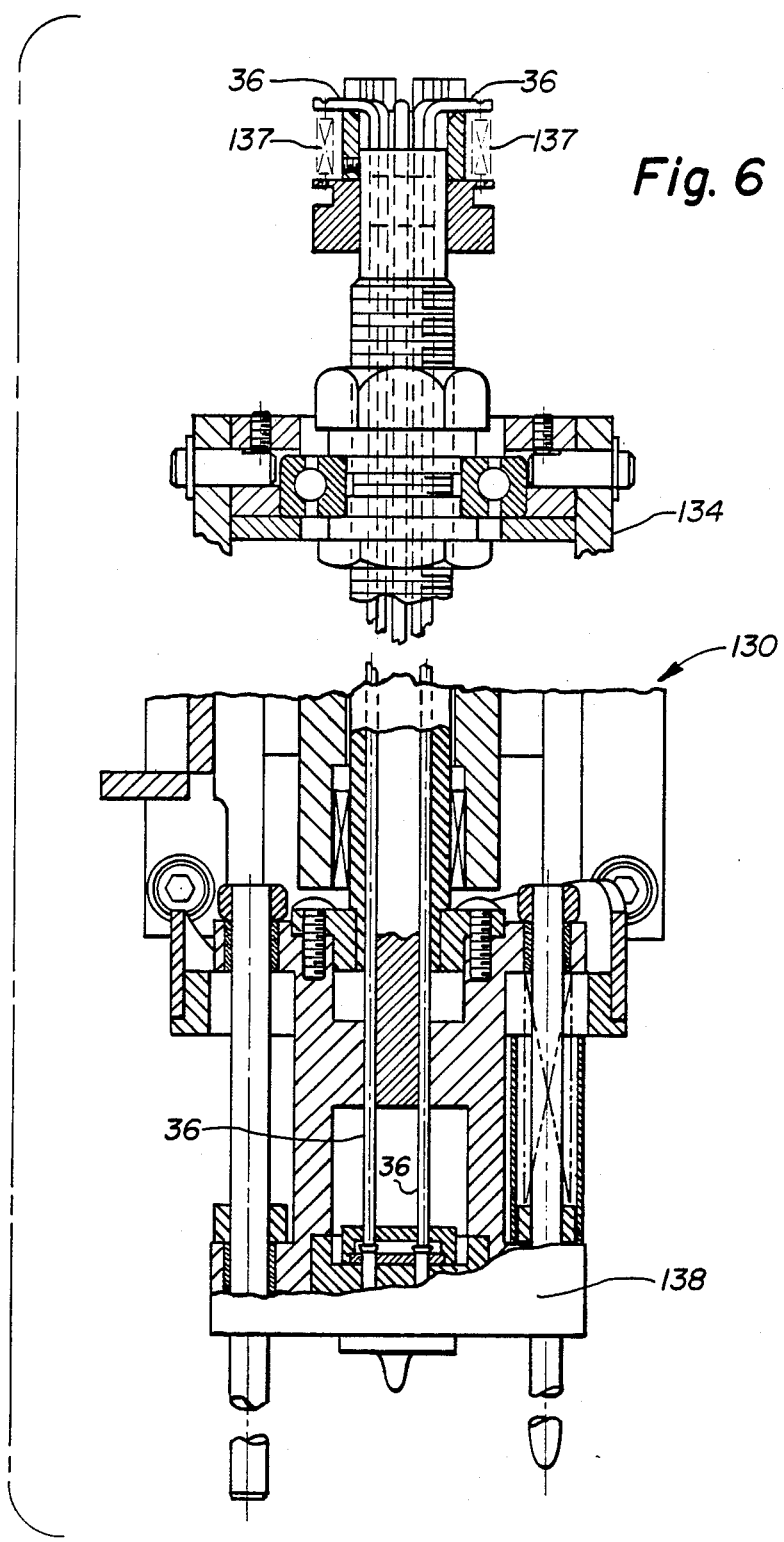
FIG. 6 shows a portion of the novel first mold assembly according to the present invention.

The improved stem 20', shown in FIG. 3, is made using a novel first mold assembly 130, shown in FIG. 6, which has a first mold head 134 attached thereto. A plurality of conventional lead weights 36 are attached to one end of the mold head 134 by a plurality of springs 137 which exert a downward force on the lead-weights 36. An improved first mold block 138 is attached to the other end of the first mold head 134 by screws (not shown). The improved first mold block 138 is shown in detail in FIG. 7. The first mold block 138 has a first surface 140 and an oppositely disposed second surface 142. A cavity 144 is formed in the second surface 142. The first surface 140 includes a stem press portion 146 having a centrally disposed projection 148 extending away from the stem press portion. A plurality of fillet recesses 150 circumscribe the projection 148 and each fillet recess communicates through a guide opening 152 with a buffer-pin-well 154, which opens into the cavity 144 in the second surface 142. A novel lead-weight translator 156 is disposed within the cavity 144. The translator 156 has a first surface 158, in contact with the bottom of the cavity 144, and a second surface 160, which is spaced from the first surface 158. The first surface 158 of the translator 156 has a translator recess 162 formed therein. A plurality of lead-weight apertures 164 extend from the translator recess 162 through the second surface 160 of the translator 156. A novel pin holder 166 is disposed within the translator recess 162 and, preferably, secured to the translator 156 by, for example, screws 168 (only one of which is shown). The pin holder 166 has a plurality of pin apertures 170 therethrough which are aligned with the buffer-pin-wells 154 in the first mold block 138 and also with the lead-weight apertures 164 in the translator 156. A plurality of novel lead-in-conductor-buffer-pins 172, 174 and 176 are disposed within the pin apertures 170 and extend into the pin wells 154. Each of the buffer pins has a head-end 178, a shank 180 and a butt-end 182. The buffer pins 172 (only one of which is shown) have a bore 184 which extends longitudinally through the buffer pin to accommodate the internal portion of the (longest) lead-in conductor 24 (shown in phantom). A plurality of buffer pins 174 (only one of which is shown) include a longitudinally extending lead-in encompassing cavity 186 which extends for a distance less than the total length of the buffer pin 174 and accommodates the internal portion of the lead-in conductor 24'. A plurality of buffer pins 176 (only one of which is shown) comprise solid pins which provide contact to the internal portion of the (shortest) lead-in conductor 24".

Figure 7:
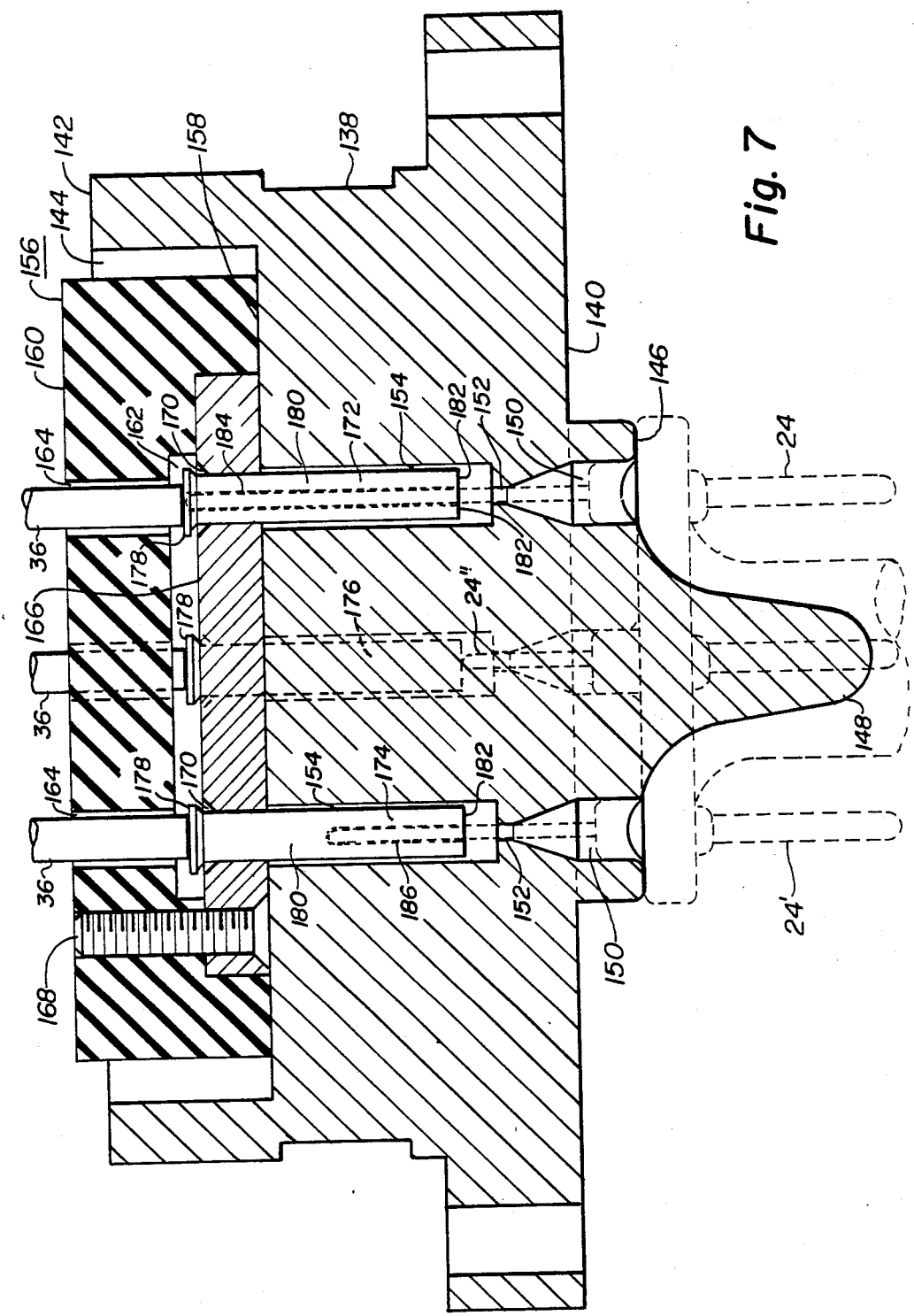
FIG. 7 shows a first mold block, a lead-weight translator, a pin holder and a plurality of buffer pins according to the present invention.

An advantage of the novel first mold assembly 130 can be appreciated by noting, in FIG. 7, that the lead-weights 36, which extend through the lead-weight apertures 164 in a translator 156 and contact the head-end 178 of each of the buffer pins, are of identical length. Thus, the internal lengths of the lead-in conductors 24, 24' and 24" can be varied by obtaining lead-in conductors of the desired internal lengths and by providing buffer pins which contact and accommodate the internal portions of the lead-in conductors as described previously. Rather than providing lead-weights of various lengths to contact the internal portions of the lead-in conductors 24, 24' and 24", the prior art lead-weights can be utilized without modification. The only modification that is necessary is to provide a first mold block 138 with buffer pin apertures 154, a lead-weight translator 156, a pin holder 166, and a plurality of buffer pins which contact and/or enclose the interior portions of the lead-in conductors of various lengths. In order to provide and maintain sufficient tolerance between the translator 156, the holder 166 and the buffer pins 172, 174, and 176, and to withstand the glass sealing temperature, all the elements, preferably, are made of stainless steel and have the same expansion characteristics. The lead-weights 36 can be made of conventional drill rod since they are not exposed, directly, to the glass-sealing flame.

In the event that it is desirable to change the internal lengths of the lead-in conductors, new conductors of the desired internal lengths can be obtained commercially and the buffer pins can be modified by changing the lengths of the internal cavities 184 and 186. Additionally, if the buffer pins 172, 174 and 176 begin to wear, replacement of the buffer pins is a relatively easy matter. The head assembly 138 is removed from the body 134 of the first mold assembly 130 and the lead-weight translator 156 is removed from the cavity 144. The screws 168 are removed so that the pin holder 166 can be detached from the translator 156 and the pins 172, 174, 176 then can be replaced in an expedient fashion.

Fabrication of the stem 20' is similar to the fabrication of the prior art stem 20. With reference to FIGS. 2, 6 and 7, a plurality of lead-in conductors 24, 24' and 24" are loaded into the plurality of lead-in conductor cavities 60 in the second mold assembly 32, which is in spaced-apart relation to the first mold assembly 130. The first mold assembly 130 includes the improved first mold block 138 (FIG. 7) having the properly configured buffer pins 172, 174 and 176 positioned therein as described above. A mass of glass, (not shown) is positioned around the lead-in conductors 24, 24' and 24" on the second mold head 44 and a tubulation 26 is disposed within the centrally disposed aperture 58 and recess 48 formed in the second mold assembly 32 as is known in the art. The mass of glass, (not shown), the tubulation 26, the lead-in conductors 24, 24' and 24", and the second mold head 44 are heated e.g. with a gas flame (not shown) to a temperature sufficient to melt the glass and a portion of the tubulation. The first mold assembly 130 is repositioned relative to the second mold assembly 32 so that the internal portions of the lead-in conductors 24, 24' and 24" extend through the plurality of guide openings 152 in the first mold block 138 and communicate with the lead-in-conductor-buffer-pins 172, 174 and 176. The lead-weights 36 extend through the weight apertures 164 in the translator 156 and contact the heads-ends 178 of the buffer pins. The downward force exerted by the lead-weights 36 on the buffer pins is sufficient to hold the external portions of the lead-in conductors 24, 24' and 24" in contact with the lead-in-conductor-supports 50 of the second mold assembly 32. The first and second mold assemblies 130 and 32, respectively, are brought together so that the mold blocks, 138 and 44, simultaneously press the melted glass and the portion of the tubulation that is melted, and fuse the glass into a disc with fillets 25 around the lead-in conductors of the stem 20'. At the completion of the molding step, the first mold assembly 130 and the second mold assembly 32 are separated and the completed stem 20' is ejected from the second mold assembly 32 by an upwardly-directed pressure of the tubulation support 62 and the support platform 46 which pushes the completed stem 20' out of the second mold head 44. The process is repeated for the next stem to be manufactured.

What is claimed is:

1. In a stem mold for manufacturing a glass stem for an electron tube having at least two lead-in conductors of different internal lengths, said stem mold comprising a first mold assembly and a second mold assembly, said first mold assembly including a plurality of lead-weights and a first mold block having a first surface and an oppositely disposed second surface with a cavity formed in said second surface of said mold block, said first surface having a plurality of fillet recesses therein, wherein the improvement comprises:

each of said fillet recesses in said first mold block communicating with a buffer-pin-well opening into said cavity, a lead-weight translator disposed within said cavity, said translator having a first surface and a second surface with a translator recess formed in one of said surfaces and a plurality of lead-weight apertures extending from said recess through the other surface of said translator, a pin holder disposed within said translator recess, said pin holder having a plurality of pin apertures therethrough, and a plurality of lead-in-conductor-buffer-pins disposed within said pin apertures and extending into said pin wells in said first mold block, said buffer pins providing means for accommodating said lead-in conductors of different internal lengths, said buffer pins being in contact with said lead-weights extending through said lead-weight apertures in said translator.

2. In a stem mold for manufacturing a glass stem for an electron tube having a plurality of lead-in conductors of different internal lengths, said stem mold comprising a first mold assembly and a second mold assembly, said first mold assembly including a first mold head having therein a plurality of lead-weights of substantially equal length attached to one end of said mold head by a plurality of biasing means, a first mold block attached to the other end of said mold head, said first mold block having a first surface and an oppositely disposed second surface with a cavity formed in said second surface, said first surface including a stem-press portion having a centrally disposed projection extending away from said stem-press portion, a plurality of fillet recesses circumscribing said projection, wherein the improvement comprises:

each of said fillet recesses in said first mold block communicating through a guide opening with a buffer-pin-well opening into said cavity in said second surface of said mold block, a lead-weight translator disposed within said cavity, said translator having a first surface in contact with said cavity in said mold blocks and a second surface spaced from said first surface thereof, said first surface of said translator having a translator recess, a plurality of lead-weight apertures extending from said translator recess through said second surface of said translator, a pin holder within said translator recess, said pin holder having a plurality of pin apertures therethrough which are aligned with said plurality of buffer-pin-wells in said mold block and with said lead-weight apertures in said translator, and a plurality of lead-in-conductor-buffer-pins disposed within said pin apertures and extending into said pin wells, each of said buffer pins having a head-end, a shank, and a butt-end, said buffer pins providing means for accommodating lead-in conductors of different internal lengths, said head-end of said buffer pins being in contact with said lead-weights which extend through said lead-weight apertures in said translator.

3. A method for manufacturing a molded glass stem for an electron tube, said stem having a plurality of lead-in conductors of various internal lengths extending therethrough, said method comprising the steps of:
   (a) providing a stem mold having a first mold assembly and a second mold assembly, at least one of the stem mold assemblies being moveable relative to the other stem mold assembly, said first mold assembly including a first mold block, a lead-weight translator, a pin holder and a plurality of lead-in-conductor-buffer-pins disposed within said pin holder:
   (b) positioning said first mold assembly and said second mold assembly in spaced-apart relation:
   (c) disposing said plurality of lead-in conductors in a plurality of lead-in conductor cavities formed in said second mold assembly so that one end of each of said lead-in conductors is in contact with a support platform assembly;
   (d) locating a mass of glass on said second mold assembly around said lead-in conductors;
   (e) heating said mass of glass, said lead-in conductors and said second mold assembly to a temperature sufficient to melt said glass;
   (f) repositioning said first mold assembly and said second mold assembly so that the other end of each of said lead-in conductors extends through one of a plurality of guide openings in said first mold assembly and communicate with said lead-in-conductor-buffer-pins;
   (g) contacting each of said lead-in-conductor-buffer-pins with a different one of a plurality of substantially equal length lead-weights extending through a plurality of lead-weight apertures in said translator of said first mold assembly to maintain said one end of said lead-in conductors in contact with said support platform of said second mold assembly; and
   (h) pressing said mass of melted glass between the first and second mold assemblies to fuse said glass around said lead-in conductors of said stem.

* * * * *